US012057934B2

(12) United States Patent
Thomson et al.

(10) Patent No.: US 12,057,934 B2
(45) Date of Patent: Aug. 6, 2024

(54) METHODS AND APPARATUS FOR SUB-CARRIER INTERLEAVING TO IMPROVE OVERALL FORWARD ERROR CORRECTION

(71) Applicant: Infinera Corporation, San Jose, CA (US)

(72) Inventors: Sandy Thomson, Ottawa (CA); Sofia Amado, Nuremberg (DE); Aroutchelvame Mayilavelane, Ottaw (CA); Christopher Fludger, Nuremberg (DE); Scott Pringle, Ottawa (CA); Ahmed Awadalla, Ottawa (CA); Han Sun, Ottawa (CA); Ting-Kuang Chiang, Saratogo, CA (US); Yuejian Wu, Ottawa (CA)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/403,815

(22) Filed: Aug. 16, 2021

(65) Prior Publication Data
US 2022/0216939 A1    Jul. 7, 2022

Related U.S. Application Data

(60) Provisional application No. 63/065,730, filed on Aug. 14, 2020.

(51) Int. Cl.
*H04L 1/00*     (2006.01)
*H04B 10/2575*  (2013.01)
*H04B 10/61*    (2013.01)

(52) U.S. Cl.
CPC .......... *H04L 1/0041* (2013.01); *H04L 1/0045* (2013.01); *H04B 10/2575* (2013.01); *H04B 10/6165* (2013.01)

(58) Field of Classification Search
CPC ... H04L 1/0041; H04L 1/0045; H04L 1/0063; H04L 1/0065; H04L 1/0071
See application file for complete search history.

(56) References Cited

U.S. PATENT DOCUMENTS 7,734,191 B1 * 6/2010 Welch .................... B82Y 20/00
                                                  398/25
8,548,331 B1 * 10/2013 Zanoni .................... H04B 10/90
                                                  398/115

(Continued)

FOREIGN PATENT DOCUMENTS

WO    WO-2005043786 A1 *  5/2005  .......... H04J 14/0298

*Primary Examiner* — Shelly A Chase
(74) *Attorney, Agent, or Firm* — David L. Soltz

(57)  ABSTRACT

Consistent with the present disclosure, multiple forward error correction (FEC) encoders are provided for encoding a respective one of a plurality of data streams. A mechanism is provided to mix or interleave portions of the encoded data such that each subcarrier carries information associated with each data stream, as opposed to each subcarrier carrying information associated with only a corresponding one of the data streams. As a result, both higher SNR and low SNR optical subcarriers carry such information, such that errors occurring during transmission are distributed and not concentrated or limited to information associated with a single data stream. Accordingly, at the receive end, each FEC decoder decodes information having a similar overall error rate. By balancing the error rates across each FEC encoder/decoder pair, the overall ability to correct errors improves compared to a system in which mixing or interleaving is not carried out.

20 Claims, 15 Drawing Sheets

(56) References Cited

U.S. PATENT DOCUMENTS

| | | | |
|---|---|---|---|
| 9,634,803 B1* | 4/2017 | Cai | H04L 1/0041 |
| 11,070,312 B1* | 7/2021 | Oveis Gharan ... | H03M 13/6572 |
| 2012/0008952 A1* | 1/2012 | Li | H04L 27/0014 |
| | | | 398/65 |
| 2016/0192042 A1* | 6/2016 | Mitchell | H04B 10/0793 |
| | | | 398/48 |
| 2019/0245627 A1* | 8/2019 | Rahn | H04B 10/516 |
| 2020/0177307 A1* | 6/2020 | Pan | H04L 1/0045 |

* cited by examiner

Inputs to Distributors 506

Outputs from Interleavers

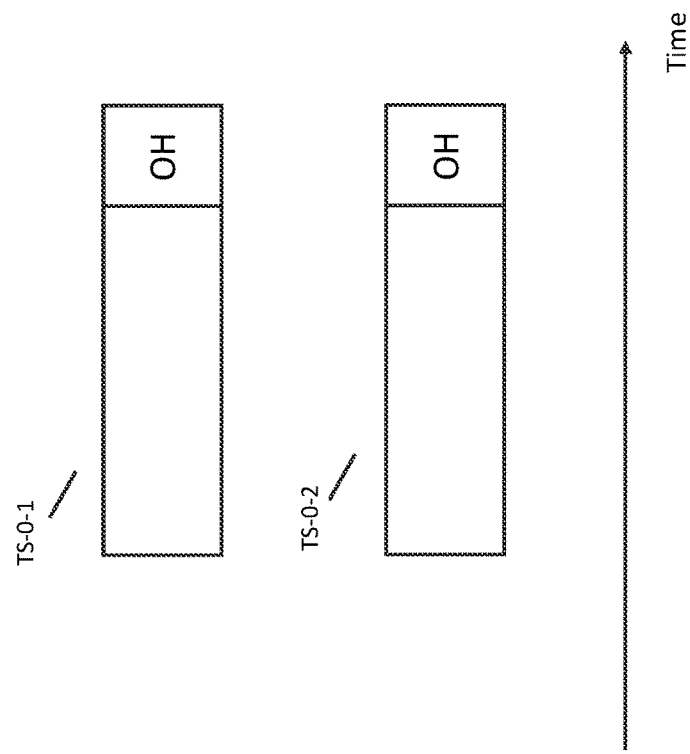
New Fig. 11c
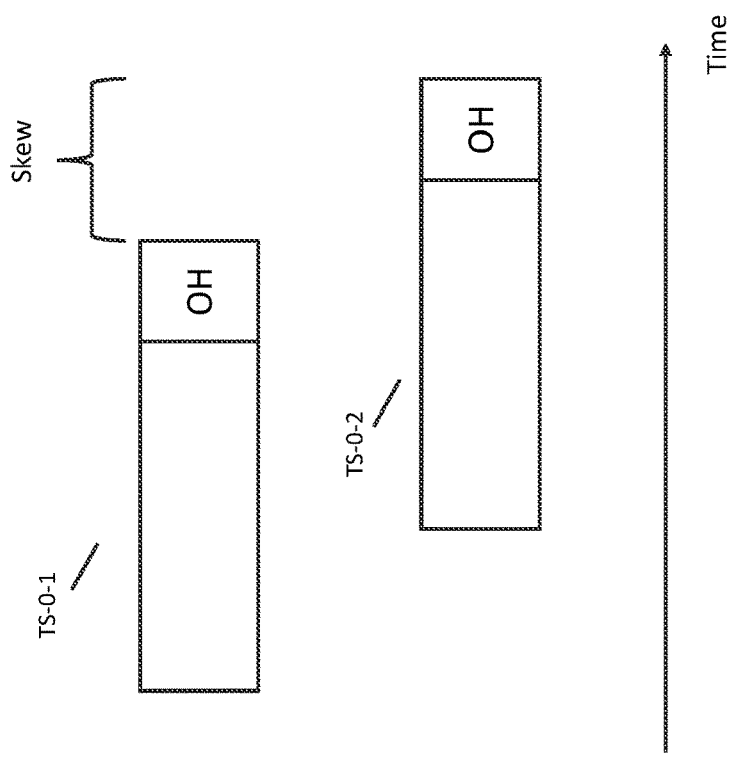
New Fig. 11b

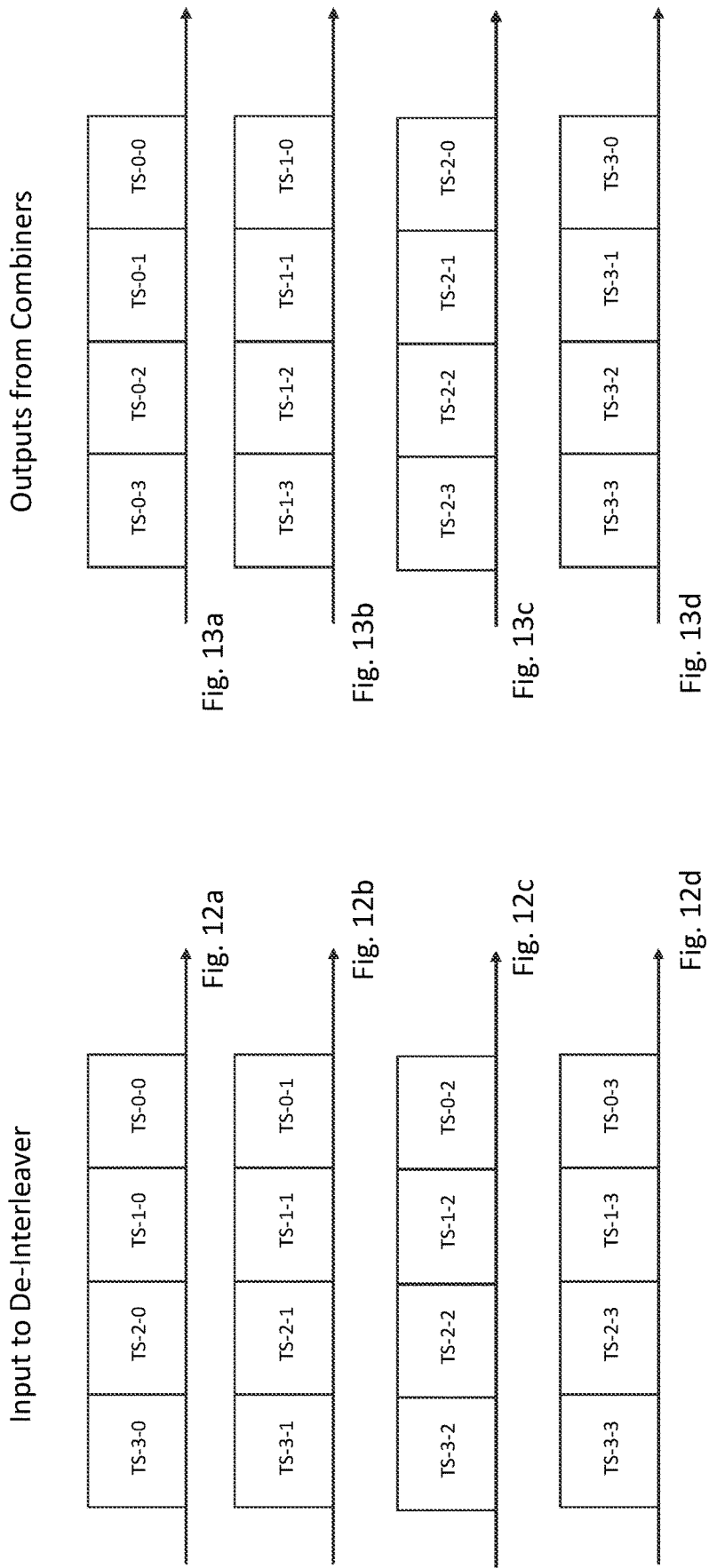

_METHODS AND APPARATUS FOR SUB-CARRIER INTERLEAVING TO IMPROVE OVERALL FORWARD ERROR CORRECTION_

The present patent application hereby claims priority to the provisional patent application identified by U.S. Ser. No. 63/065,730 filed on Aug. 14, 2020, the entire content of which is hereby incorporated by reference.

BACKGROUND

Optical transmission systems often send data by modulating an optical carrier wave. Conventionally, such a carrier wave is modulated based on a single data stream. Recently, so-called digital subcarriers have been proposed, where a carrier wave is modulated based on digitally generated subcarriers in the electrical domain to provide corresponding optical subcarriers, each of which being modulated independently based on a unique data stream. Optically, the spectrum of the carrier wave appears to be made of multiple independent smaller bandwidth subcarriers, each of which having a corresponding frequency within the envelope of the carrier wave spectrum. The digital sub-carrier technique has advantages over the conventional single carrier technique. For example, the optical subcarriers may be generated and detected with a common set of optical components, as well as analog-to-digital and digital-to-analog converters. In addition, optical subcarrier transmission may realize improved performance such as reduced chromatic dispersion and non-linear impairments.

Due to various analog bandwidth constraints, the signal to noise ratio (SNR) of each sub-carrier may differ. For example, if all the subcarriers associated with a common laser are routed together from a transmitter to a receiver, the subcarriers that are adjacent the center of the overall spectrum, e.g., nearest the carrier frequency of the laser, tend to have better SNR compared to those at the outer edge of the overall spectrum, e.g., having frequencies the farthest from the carrier frequency, due to the analog bandwidth constraint of the system. In a routable sub-carrier system, where data associated each subcarrier or a group of sub-carriers can be independently routed from the same hub node to multiple leaf notes or vice versa, the SNR of each sub-carrier may also depend on the channel loss from the hub to a particular leaf or vice versa via a particular channel or path, as well as various impairments of such channel. As a result, since each optical subcarrier may have a different SNR, each subcarrier may have different performance, such as a different bit error rate (BER).

SUMMARY

Consistent with an aspect of the present disclosure, both point-to-point and point-to-multipoint systems are provided whereby data streams are encoded, and rather than assigned to a corresponding subcarrier, that encoded data streams are associated with multiple subcarriers.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the present disclosure and together with the description, serve to explain the principles of the invention.

BRIEF DESCRIPTION OF THE DRAWINGS

FIGS. 6a-6d show a sequence of time slots consistent with the present disclosure;

FIGS. 7a-7d show a further sequence of time slots consistent with the present disclosure;

FIGS. 11b and 11c show examples of time slots consistent with an additional aspect of the present disclosure;

FIGS. 12a to 12d show sequences of time slots in accordance with an aspect of the present disclosure;

FIGS. 13a to 13d show sequences of time slot consistent with an additional aspect of the present disclosure;

DESCRIPTION OF THE EMBODIMENTS

Consistent with the present disclosure, multiple forward error correction (FEC) encoders are provided for encoding a respective one of a plurality of data streams. A mechanism is provided to mix or interleave portions of the encoded data such that each subcarrier carries information associated with each data stream, as opposed to each subcarrier carrying information associated with only a corresponding one of the data streams. As a result, both higher SNR and low SNR optical subcarriers carry such information, such that errors occurring during transmission are distributed and not concentrated or limited to information associated with a single data stream. Accordingly, at the receive end, each FEC decoder decodes information having a similar overall error rate. By balancing the error rates across each FEC encoder/decoder pair, the overall ability to correct errors improves compared to a system in which mixing or interleaving is not carried out.

Reference will now be made in detail to the present embodiments of the disclosure, examples of which are illustrated in the accompanying drawings. Wherever possible, the same reference numbers will be used throughout the drawings to refer to the same or like parts.

Figure 1:
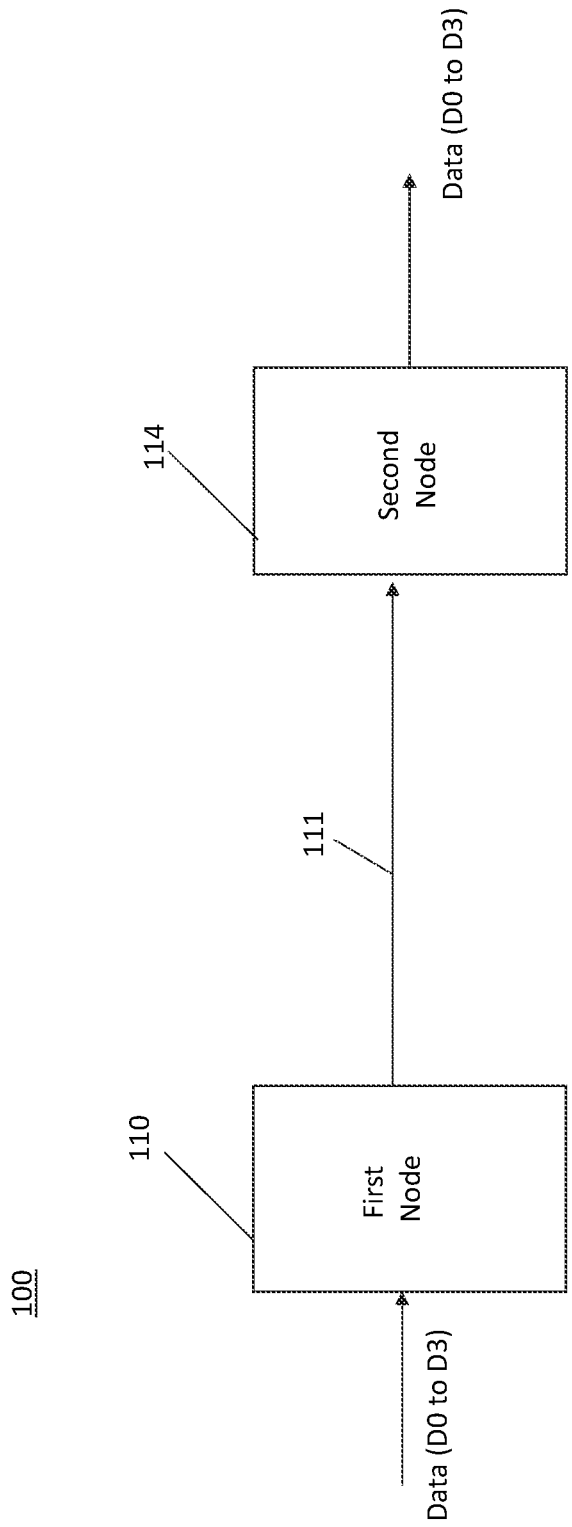
FIG. 1 illustrates an optical communication system consistent with the present disclosure.

FIG. 1 illustrates a high level block diagram of an optical communication system 100 including a first node 110 and a second node 114 interconnected by an optical communication path 111, including, for example, one or more segments of optical fiber as well as one or more optical amplifiers. In a further example, first node 110 may receive data as plurality of data streams or portions D0 to D3. A plurality of FEC encoders is provided in the first node 110 to provide a respective encoded data streams. Based on such data streams, first node 110 provides a modulated optical signal, as described in greater detail below, that includes a plurality of optical subcarriers. In one example, each of the plurality of optical subcarriers are Nyquist subcarriers, which are a group of optical signals, each carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

As further discussed below, information associated with each encoded data stream is distributed across the plurality of optical subcarriers, instead of each subcarrier being associated only a corresponding encoded data stream. At second node 114, de-interleaving is carried out to reconstruct the encoded data streams and each reconstructed data stream is provided to a respective FEC decoder. Thus, each FEC decoder in second node 114 decodes information that has been transmitted over both high and low SNR subcarriers, such that overall error correction is improved, as opposed to a system in which a given FEC decoder decodes only information associated with a high SNR subcarrier and another FEC decoder decodes only information associated with a low SNR subcarrier.

Figure 2:
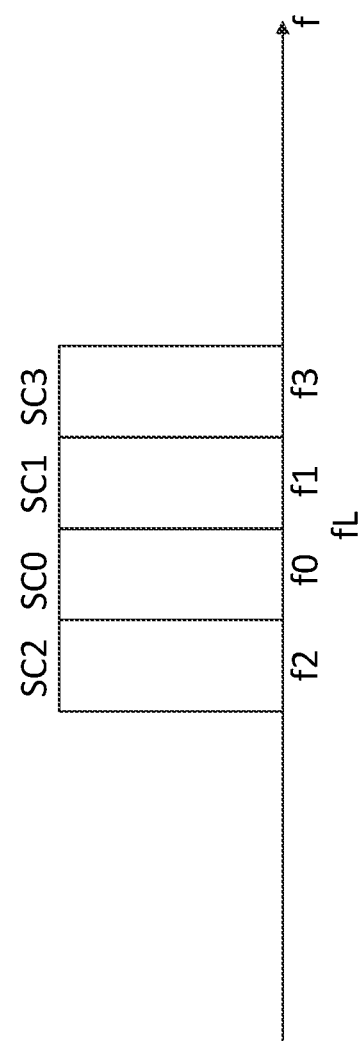
FIG. 2 shows an example of a power spectral density plot consistent with an aspect of the present disclosure.

FIG. 2 illustrates an example of a power spectral density plot of four subcarriers SC0 to SC3, each of which having a respective one of frequency f0 to f3. It is understood that more or fewer optical subcarriers may be generated and received consistent with the present disclosure and the number of optical subcarriers disclosed herein is merely exemplary.

Optical subcarriers SC0 to SC3 are generated, as discussed in greater detail below, by modulating an optical signal that is output from a laser. The optical signal has a carrier frequency fL. As further shown in FIG. 2, optical subcarriers SC0 and SC2 have respective frequencies f0 and f2, which are less than carrier frequency fL, and optical subcarriers SC1 and SC3 have respective frequencies f1 and f3 that are greater than carrier frequency fL. In some instances, those optical subcarriers having frequencies closer to the carrier frequency fL ("inner" subcarriers), such as optical subcarriers SC0 and SC1 have fewer impairments and greater SNR than optical subcarriers that have frequencies that are not closer to carrier frequency fL ("outer" subcarriers), such as optical subcarriers SC2 and SC3.

Figure 3:
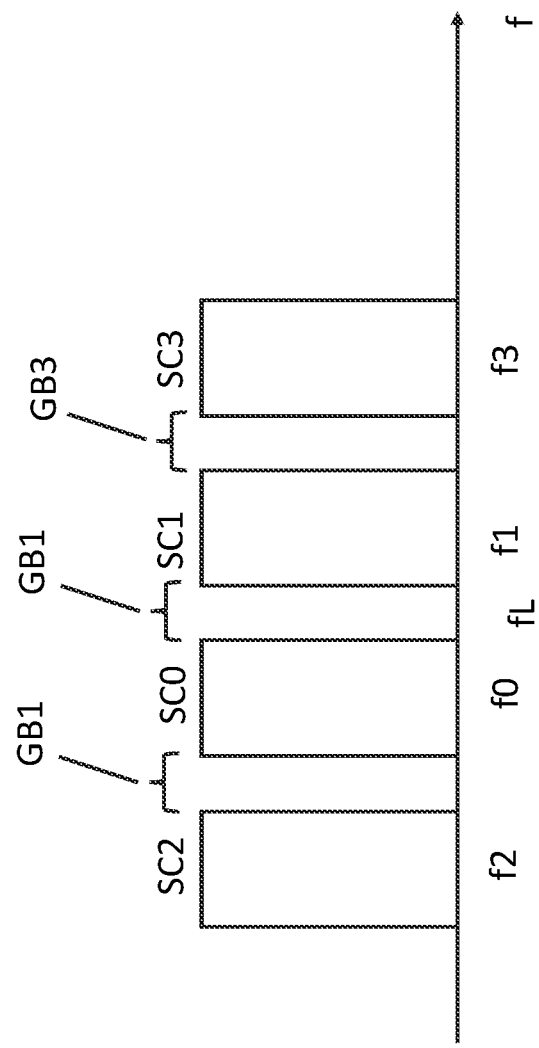
FIG. 3 shows a further example of a power spectral density plot consistent with an additional aspect of the present disclosure.

FIG. 3 shows an alternative embodiment in which optical subcarriers SC0 to SC3 are spectrally spaced from one another by so-called "guard bands." Namely, subcarriers SC0 and SC2 are spectrally separated from one another by guard band GB1, subcarriers SC0 and SC1 are spectrally separated from one another by guard band GB2, and subcarriers SC1 and SC3 are spectrally separated from one another by guard band GB3. Spectrally separating the optical subcarriers facilitates more accurate detection and processing of each subcarrier by reducing crosstalk or other interference between the subcarriers.

Figure 4:
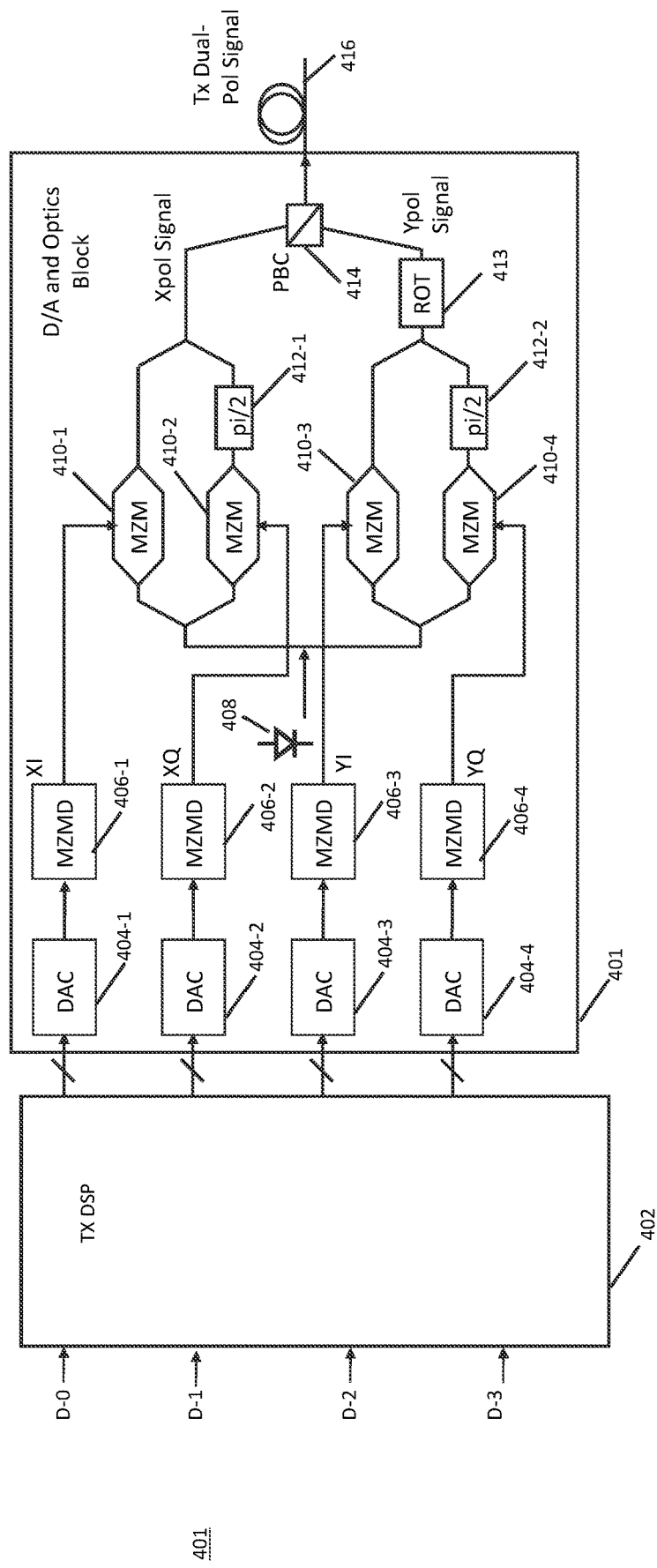
FIG. 4 shows a block diagram of a transmitter consistent with the present disclosure.

FIG. 4 shows an example of a transmitter 401 which may be included in first node 110. Transmitter 401 includes a transmitter DSP (TX DSP) 402 and a D/A and optics block 401. TX DSP 402 receives input data streams D0 to D3. Based on such data streams, TX DSP 402 supplies a plurality of digital outputs to D/A and optics block 401 including digital-to-analog conversion (DAC) circuits 404-1 to 404-4, which convert digital signals received from DSP 402 into corresponding analog signals. D/A and optics block 401 also includes driver circuits 406-1 to 406-4 that receive the analog signals from DACs 404-1 to 404-4 and adjust the voltages or other characteristics thereof to provide drive signals to a corresponding one of modulators 410-1 to 410-4.

D/A and optics block 401 further includes modulators 410-1 to 410-4, each of which may be, for example, a Mach-Zehnder modulator (MZM) that modulates the phase and/or amplitude of the light output from laser 408. As further shown in FIG. 4, light output from laser 408, also included in block 401, is split such that a first portion of the light is supplied to a first MZM pairing, including MZMs 410-1 and 410-2, and a second portion of the light is supplied to a second MZM pairing, including MZMs 410-3 and 410-4. The first portion of the light is split further into third and fourth portions, such that the third portion is modulated by MZM 410-1 to provide an in-phase (I) component of an X (or TE) polarization component of a modulated optical signal, and the fourth portion is modulated by MZM 410-2 and fed to phase shifter 412-1 to shift the phase of such light by 90 degrees in order to provide a quadrature (Q) component of the X polarization component of the modulated optical signal. Similarly, the second portion of the light is further split into fifth and sixth portions, such that the fifth portion is modulated by MZM 410-3 to provide an I component of a Y (or TM) polarization component of the modulated optical signal, and the sixth portion is modulated by MZM 410-4 and fed to phase shifter 412-2 to shift the phase of such light by 90 degrees to provide a Q component of the Y polarization component of the modulated optical signal.

The optical outputs of MZMs 410-1 and 410-2 are combined to provide an X polarized optical signal including I and Q components and are fed to a polarization beam combiner (PBC) 414 provided in block 401. In addition, the outputs of MZMs 410-3 and 410-4 are combined to provide an optical signal that is fed to polarization rotator 413, further provided in block 401, that rotates the polarization of such optical signal to provide a modulated optical signal having a Y (or TM) polarization. The Y polarized modulated optical signal also is provided to PBC 414, which combines the X and Y polarized modulated optical signals to provide a polarization multiplexed ("dual-pol") modulated optical signal onto optical fiber 416, for example, which may be included as a segment of optical fiber in optical communication path 111.

The polarization multiplexed optical signal output from D/A and optics block 401 includes subcarriers SC0-SC3 noted above, such that each subcarrier has X and Y polarization components and I and Q components. Moreover, each subcarrier SC0 to SC3 may be associated with or corresponds to a respective one of data streams D0 to D3.

Figure 5:
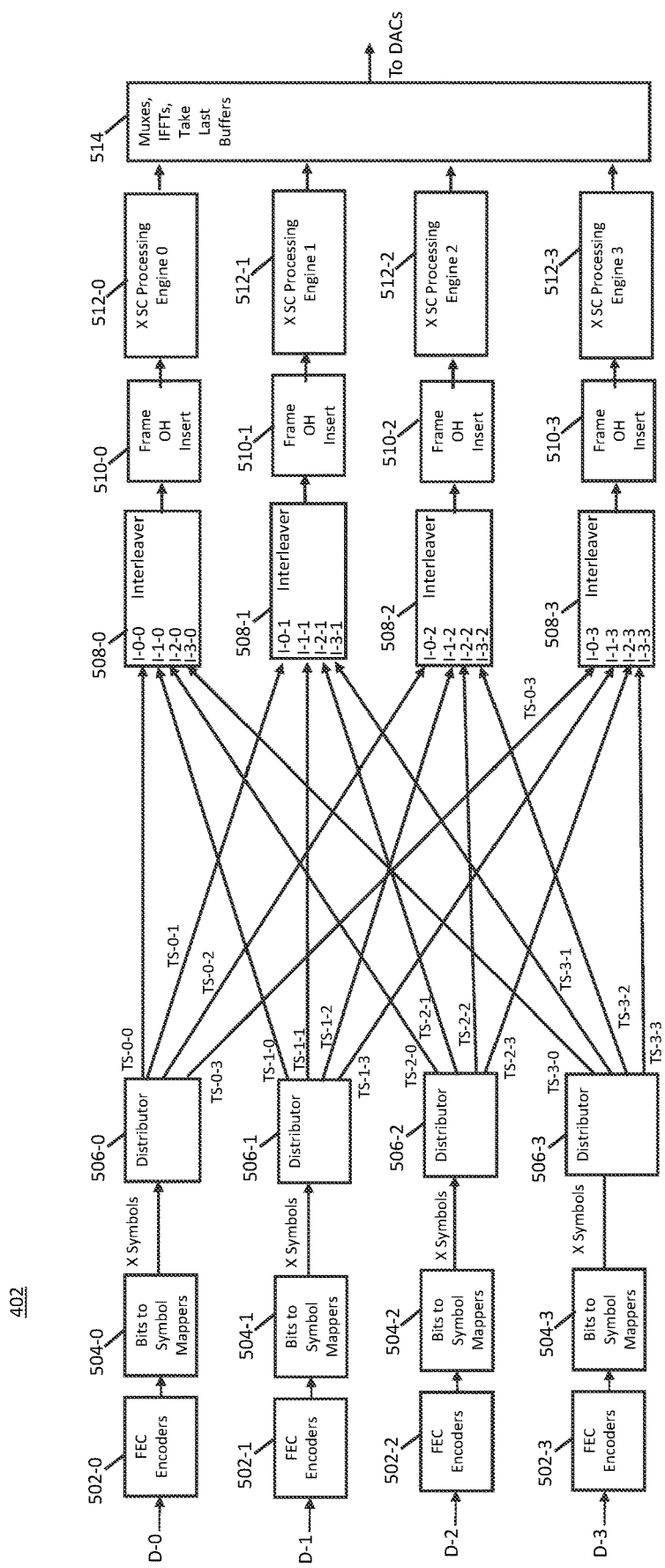
FIG. 5 shows a detailed view of a digital signal processor (DSP) included in the transmitter of FIG. 4.

FIG. 5 shows an example of TX DSP 402 in greater detail. TX DSP 402 may include FEC encoders 502-0 to 502-3, each of which may receive a respective one of data streams D0 to D3. FEC encoders 502-0 to 502-3 carry out forward error correction coding on a corresponding segment of data streams D0 to D3, for example, by adding parity bits to the received data segment. Put another way, each forward error correction encoder 502-0 to 502-3 receives bits of a respective one of data streams D0 to D3.

Each of FEC encoders 502-0 to 502-3 provides an output or encoded data to a corresponding one of a plurality of bits-to-symbol circuits, 504-0 to 504-3 (collectively referred to herein as "504") based on the received bits. Each of bits-to-symbol circuits 504 may map the encoded bits to symbols on a complex plane. For example, bits-to-symbol circuits 504 may map four bits to a symbol in a dual-polarization QPSK constellation. Each of bits-to-symbol circuits 504 provides first symbols, having the complex representation XI+j*XQ, associated with data stream D0 to DSP to a corresponding one of distributors 506-0 to 506-3. Data indicative of such first symbols is carried by the X polarization component of each subcarrier SC0-SC3.

Additional bits-to-symbol circuits, similar to bits to symbol mappers 504-0 to 504-3, may also be included to provide second symbols having the complex representation YI+j*YQ, also associated with a corresponding one of data streams D0 to D3. Data indicative of such second symbols, however, is carried by the Y polarization component of each of subcarriers SC0 to SC3.

Such mapping, as carried by about circuit 504-0 to 504-3 defines, in one example, a particular modulation format for each subcarrier. That is, such circuit may define a mapping for all the optical subcarrier that is indicative of a binary phase shift keying (BPSK) modulation format, a quadrature phase shift keying (QPSK) modulation format, or an m-quadrature amplitude modulation (QAM, where m is a positive integer, e.g., 4, 8, 16, or 64) format. In another example, one or more of the optical subcarriers may have a modulation format that is different than the modulation format of other optical subcarriers. That is, one of the optical subcarriers have a QPSK modulation format and another optical subcarrier has a different modulation format, such as 8-QAM or 16-QAM. In another example, one of the optical subcarriers has an 8-QAM modulation format and another optical subcarrier has a 16 QAM modulation format. Accordingly, although all the optical subcarriers may carry data at the same data and or baud rate, consistent with an aspect of the present disclosure one or more of the optical subcarriers may carry data at a different data or baud rate than one or more of the other optical subcarriers. Moreover, modulation formats, baud rates and data rates may be changed over time depending on capacity requirements, for example. Adjusting such parameters may be achieved, for example, by applying appropriate signals to the X and Y mappers.

As further shown in FIG. 5, each bits to symbol mappers 504-0 to 504-3 supplies a corresponding series of X polarization symbols to a respective one of distributor circuits 506-0 to 506-3. Each distributor circuit 506 divides the incoming stream into data portions or time slots, each of which is then supplied to a respective interleaver circuit 508-0 to 508-3.

For example, FIG. 6a shows a series of time slots or data portions TS-0-0, TS-0-1, TS-0-2, and TS-0-3 output from mapper 504-0 and input to distributor 506-0. FIG. 6b shows a series of time slots or data portions TS-1-0, TS-1-1, TS-1-2, and TS-1-3 output from mapper 504-1 to distributor 506-1, and FIG. 6c shows a series of time slots or data portions TS-2-0, TS-2-1, TS-2-2, and TS-2-3 output from mapper 504-2 and input to distributor 506-2. Further, FIG. 6c shows a series of time slots or data portions TS-2-0, TS-2-1, TS-2-2, and TS-2-3 output from mapper 504-3 and input to distributor 506-3. Each time slot or data portion is indicative of corresponding encoded data output from a respective one of FEC encoders 502-0 to 502-3.

As further shown in FIG. 5, each time slot is supplied to a corresponding input of interleaver 508. Table 1 below lists each interleaver input and the time slot received by such input.

TABLE 1

| Interleaver Input | Time Slot | Interleaver |
|---|---|---|
| I-0-0 | TS-0-0 | 508-0 |
| I-1-0 | TS-1-0 | 508-0 |
| I-2-0 | TS-2-0 | 508-0 |
| I-3-0 | TS-3-0 | 508-0 |
| I-0-1 | TS-0-1 | 508-1 |
| I-1-1 | TS-1-1 | 508-1 |
| I-2-1 | TS-2-1 | 508-1 |
| I-3-1 | TS-3-1 | 508-1 |
| I-0-2 | TS-0-2 | 508-2 |
| I-1-2 | TS-1-2 | 508-2 |
| I-2-2 | TS-2-2 | 508-2 |
| I-3-2 | TS-3-2 | 508-2 |
| I-0-3 | TS-0-3 | 508-3 |
| I-1-3 | TS-1-3 | 508-3 |
| I-2-3 | TS-2-3 | 508-3 |
| I-3-3 | TS-3-3 | 508-3 |

With reference to FIGS. 7a to 7d, each of interleaver circuits 508-0 to 508-3 combines the received time slots or data portions to provide a series of time slots whereby each time slot is associated with a corresponding data stream or encoder output. For example, as shown in FIG. 7a, interleaver 508-0 receives time slots TS-0-0, TS-1-0, TS-2-0, and TS-3-0, and successively outputs these time slots as shown with time slot TS-0-0 being output first. As shown in FIG. 7b, interleaver 508-1 receives time slots TS-0-1, TS-1-1, TS-2-1, and TS-3-1, and successively outputs these time slots as shown with time slot TS-0-1 being output first, and as shown in FIG. 7c, interleaver 508-2 receives time slots TS-0-2, TS-1-2, TS-2-2, and TS-3-2, and successively outputs these time slots as shown with time slot TS-0-2 being output first. Moreover, as shown in FIG. 7d, interleaver 508-3 receives time slots TS-0-3, TS-1-3, TS-2-3, and TS-3-3, and successively outputs these time slots as shown with time slot TS-0-3 being output first.

Returning to FIG. 5, each series of time slots is supplied from a corresponding one of interleaver circuits 508-0 to 508-3 to a respective one of frame overhead insertion circuits 510-0 to 510-3, which inserts overhead bits or bytes into each time slot. After such overhead insertion, each time slot series is supplied to a respective one of X polarization subcarrier processing engines 512-0 to 512-3, which generate respective electrical signals indicative of each subcarrier, e.g., such electrical signals being digital subcarriers. The electrical signals are subject to further processing and combining in circuit block 514 and the resulting digital signals are output to X polarization DACs 404-1 and 404-2.

For ease of explanation processing of X pol related data and symbols is described above with reference to FIG. 5. It is understood that similar circuits as those shown in Fig. may be employed to process Y pol related data and symbols to provide digital signals to Y polarization DACs 404-3 and 404-4.

Figure 8:
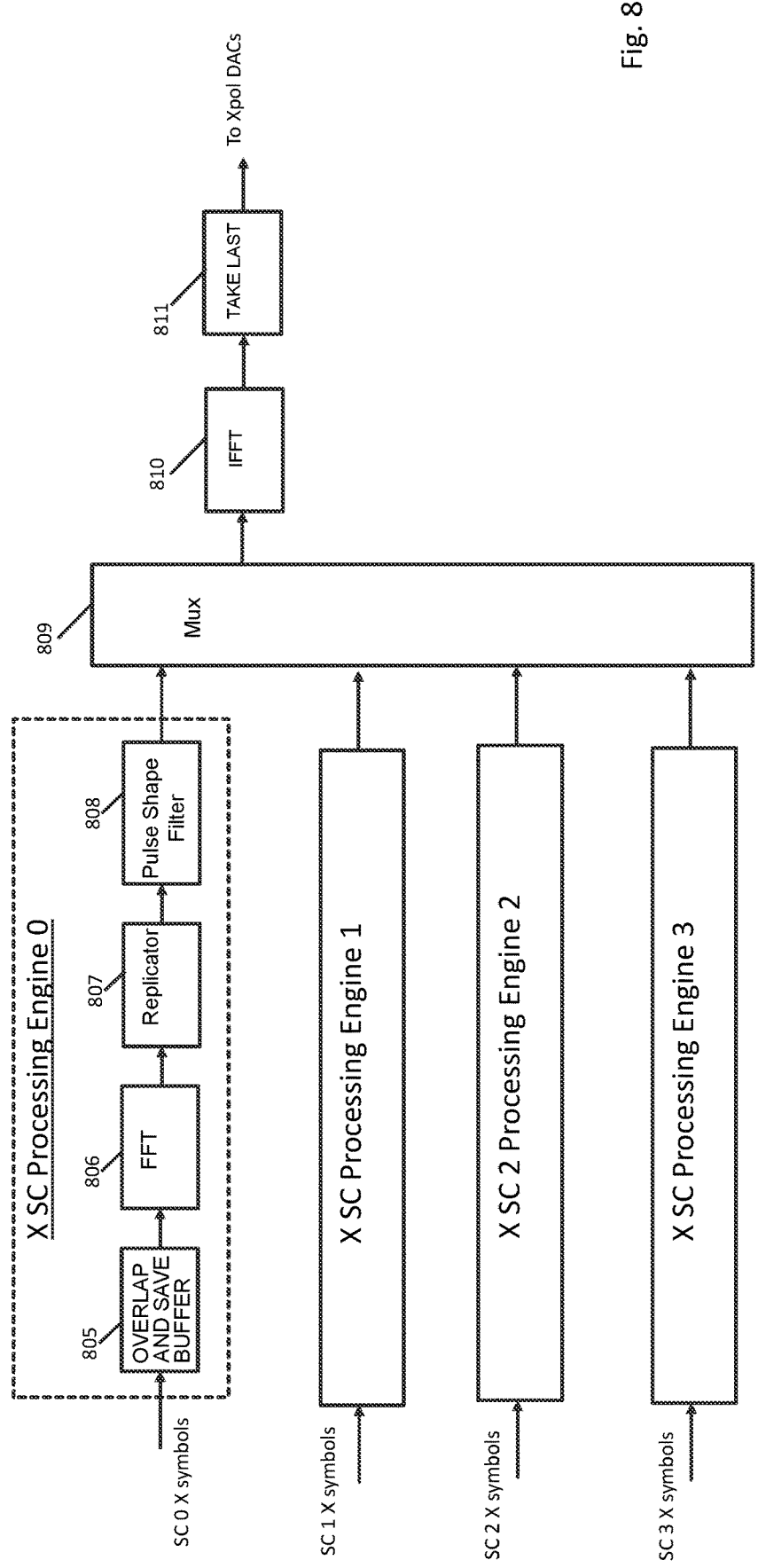
FIG. 8 shows features of the DSP provided in the transmitter shown in FIG. 4.

FIG. 8 shows the X SC Processing Engine 0 in greater detail. It is understood that remaining X SC Processing Engines 1-3 have a similar structure as X SC Processing Engine 0. X SC Processing Engine 0 receives X pol symbols in a series of time slots, for example, time slots TS-0-0, TS-1-0, TS2-0, and TS3-0 (including overhead) output from frame overhead insertion 510-1. Such time slots are supplied to overlap and save buffer 805 that may buffer an appropriate number of symbols. Overlap and save buffer 505 may receive a subset of the symbols or another number of such symbols at a time from overhead insertion circuit 510-0. Thus, overlap and save buffer 805 may combine new symbols from overhead insertion circuits 510-0 with the previous symbols received from overhead insertion circuit 510-0.

Overlap and save buffer 905 supplies an output, which is in the time domain, to a fast Fourier Transform (FFT) circuit 806. In one example, the output includes 256 symbols or another number of symbols. FFT 806 converts the received symbols to the frequency domain using or based on, for example, a fast Fourier transform.

Each interleaver 508 is associated with a corresponding one of optical subcarriers SC0 to SC3, as well as a corresponding time slot series output from each interleaver. In addition, the inputs to the FFT as well as other components within the processing engine are indicative of each time slot output from an associated interleaver 508. symbols output within each time slot and processed by the components with the processing engines 512 are indicative of each time slot.

FFT 806 includes memories or bins, whereby replicator components or circuit 807 may replicate the contents of the frequency bins and store such contents (e.g., for T/2 based filtering of the subcarrier) in a respective one of the plurality of replicator components. Such replication may increase the sample rate. In addition, replicator components or circuit 807 may arrange or align the contents of the frequency bins to fall within the bandwidths associated with pulse shaped filter circuit 808.

Pulse shape filter circuit 808 may apply a pulse shaping filter to the data stored in the frequency bins associated with FFT 806 and the replicator components or circuit 807 to thereby provide a respective one of a plurality of filtered outputs, which are multiplexed and subject to an inverse FFT, as described below. Pulse shape filter circuit 808 calculates the transitions between the symbols and the desired subcarrier spectrum so that the subcarriers can be packed together spectrally for transmission, e.g., with a close frequency separation. Multiplexer component 809, which may include a multiplexer circuit or memory, may receive the filtered outputs from pulse shape filter circuit 808, and multiplex or combine such outputs together to form an element vector.

Next, IFFT circuit or component 810 may receive the element vector and provide a corresponding time domain signal or data based on an inverse fast Fourier transform (IFFT). In one example, the time domain signal may have a rate of 64 GSample/s. Take last buffer or memory circuit 811, for example, may select the last 1024 samples, or another number of samples, from an output of IFFT component or circuit 810 and supply the samples to DACs 404-1 and 404-2 (see FIG. 4) at 64 GSample/s, for example. As noted above, DAC 404-1 is associated with the in-phase (I) component of the X pol signal, and DAC 404-2 is associated with the quadrature (Q) component of the X pol signal. Accordingly, consistent with the complex representation XI+jXQ, DAC 404-1 receives values associated with XI and DAC 404-2 receives values associated with jXQ. As indicated in FIG. 4, based on these inputs, DACs 404-1 and 404-2 provide analog outputs to MZMD 406-1 and MZMD 406-2, respectively, as discussed above, which in turn, are driven to provide the X component of subcarrier SC0. Similar processing of X pol symbols, SC 1 X to SC 3 X to provide the X components of optical subcarriers SC1 to SC3. Moreover, similar processing as that described above may be carried out with respect to the Y symbols to generate signals for driving MZMs 410-3 and 410-4 and thereby provide the Y component of each optical subcarrier.

As used herein, a modulator may refer to each MZM 410-1 to 410-4 individually or a combination of such MZMs, such as MZMs 410-1 to 410-4.

As discussed above, due to the interleaving of time slots associated with data streams D0 to D3, information associated with encoded data, as well as data streams D0 to D3, is distributed over and carried by multiple subcarriers, such that during certain time intervals, information associated with a given data stream is carried by a subcarrier have a relatively high SNR, and during another time interval, such information is carried by another subcarrier having a relatively low SNR. Put another way, a modulator including MZMs 410-1 to 410-4 is operable to modulate the optical signal output from laser 408 to provide optical subcarriers SC0-SC3. Accordingly, for example, optical subcarrier SC0 carries first information indicative of a first time slot or data portion, e.g., TS-0-0 during a first time interval and second information indicative a second time slot or data portion, e.g., TS-1-0 during a second time interval. Moreover, optical subcarrier SC1 carries information indicative of time slot TS-0-1 during the first time interval and information indicative of time slot TS-1-1 during the second time interval. The information carried by the subcarriers is further indicative of the data or bits supplied to the FEC encoders, since the time slots are also based on the outputs of the FEC encoders.

As noted above, optical subcarriers SC0 to SC3 may be provided to second node 114 via optical communication path 111. An example of receiver circuit 901 in second node 114 will be described next with reference to FIG. 9.

Figure 9:
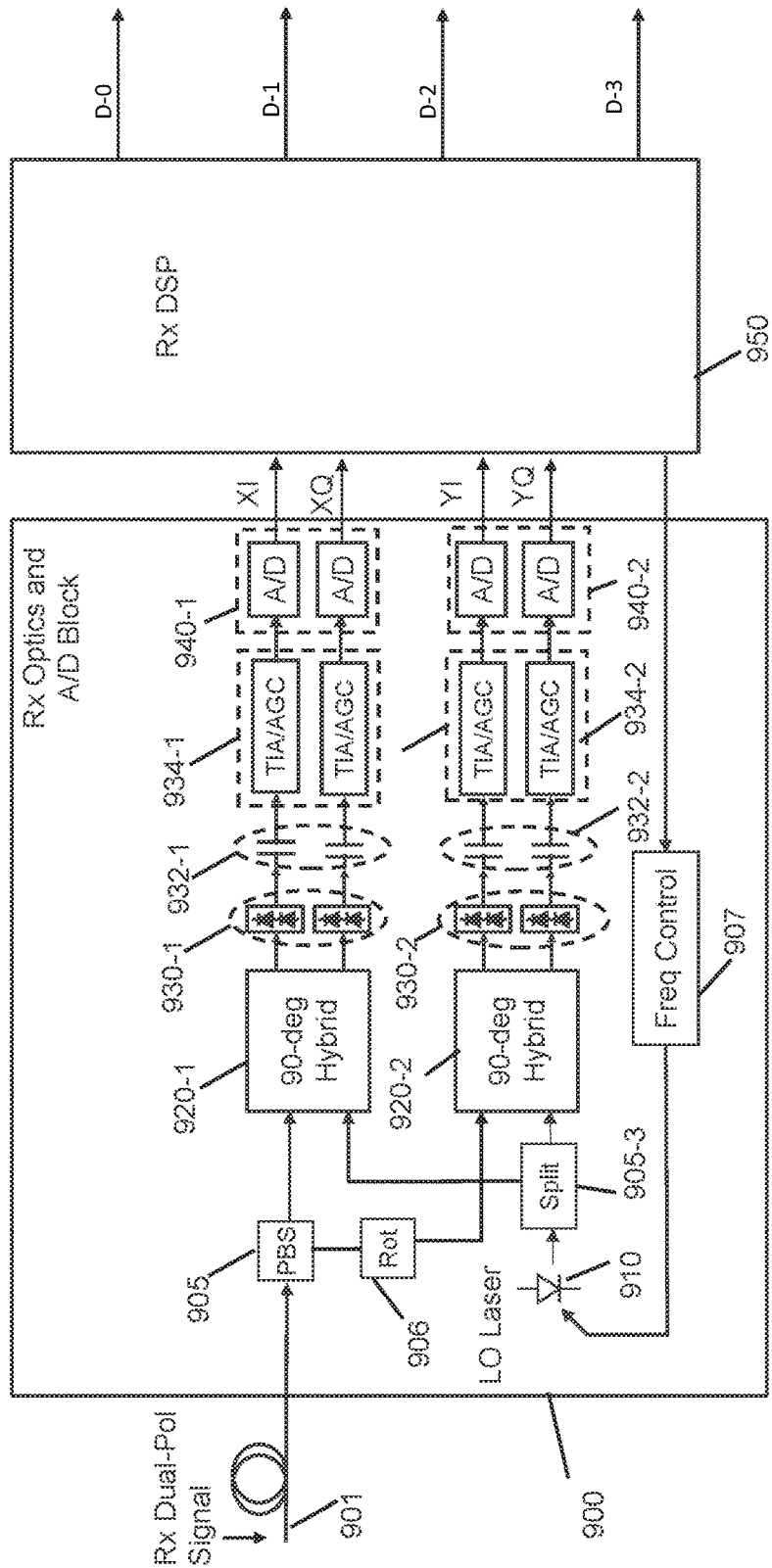
FIG. 9 shows an example of a receiver consistent with an aspect of the present disclosure.

As shown in FIG. 9, optical receiver 901 may include an Rx optics and ND block 900, which, in conjunction with DSP 950, may carry out coherent detection. Block 900 may include a polarization splitter (PBS) 905 with first (905-1) and second (905-2) outputs), a local oscillator (LO) laser 910, 90 degree optical hybrids or mixers 920-1 and 920-2 (referred to generally as hybrid mixers 920 and individually as hybrid mixer 920), detectors 930-1 and 930-2 (referred to generally as detectors 930 and individually as detector 930, each including either a single photodiode or balanced photodiode), AC coupling capacitors 932-1 and 932-2, transimpedance amplifiers/automatic gain control circuits TIA/AGC 934-1 and 934-2, ADCs 940-1 and 940-2 (referred to generally as ADCs 940 and individually as ADC 940).

Polarization beam splitter (PBS) 905 may include a polarization splitter that receives an input polarization multiplexed optical signal including optical subcarriers SC0 to SC3 supplied by optical fiber link 901, which may be, for example, an optical fiber segment as part of optical communication path 111. PBS 905 may split the incoming optical signal into the two X and Y orthogonal polarization components. The Y component may be supplied to a polarization rotator 906 that rotates the polarization of the Y component to have the X polarization. Hybrid mixers 920 may combine the X and rotated Y polarization components with light from local oscillator laser 910, which, in one example, is a tunable laser. For example, hybrid mixer 920-1 may combine a first polarization signal (e.g., the component of the incoming optical signal having a first or X (TE) polarization output from a first PBS port with light from local oscillator 910, and hybrid mixer 920-2 may combine the rotated polarization signal (e.g., the component of the incoming optical signal having a second or Y (TM) polarization output from a second PBS port) with the light from local oscillator 910. In one example, polarization rotator 990 may be provided at the PBS output to rotate Y component polarization to have the X polarization.

Detectors 930 may detect mixing products output from the optical hybrids, to form corresponding voltage signals, which are subject to AC coupling by capacitors 932-1 and 932-1, as well as amplification and gain control by TIA/AGCs 934-1 and 934-2. The outputs of TIA/AGCs 934-1 and 934-2 and ADCs 940 may convert the voltage signals to digital samples. For example, two detectors (e.g., photodiodes) 930-1 may detect the X polarization signals to form the corresponding voltage signals, and a corresponding two ADCs 940-1 may convert the voltage signals to digital samples for the first polarization signals after amplification, gain control and AC coupling. Similarly, two detectors 930-2 may detect the rotated Y polarization signals to form the corresponding voltage signals, and a corresponding two ADCs 940-2 may convert the voltage signals to digital samples for the second polarization signals after amplification, gain control and AC coupling. RX DSP 950 may process the digital samples associated with the X and Y polarization components to output data associated with one or more subcarriers within a group of subcarriers SC0 to SC3.

While the figures herein show various network components as including a particular number and arrangement of components, in some implementations, such components may include additional components, fewer components, different components, or differently arranged components. For example, the number of detectors 930 and/or ADCs 940 may be selected to implement an optical receiver 901 that is capable of receiving a polarization multiplexed signal. In some instances, one of the components illustrated in FIG. 9 may carry out a function described herein as being carry out by another one of the components illustrated in FIG. 9.

Consistent with the present disclosure, local oscillator laser 910 may be tuned to output light having a wavelength or frequency relatively close to the subcarrier wavelength(s) to thereby cause a beating between the local oscillator light and the subcarrier(s). Such beating will either not occur or will be significantly attenuated for the other non-selected subcarriers so that data carried by the selected subcarrier(s) is detected and processed by DSP 950.

The local oscillator laser 910 may be a semiconductor laser, such as a distributed feedback laser or a distributed Bragg reflector laser.

Figure 10:
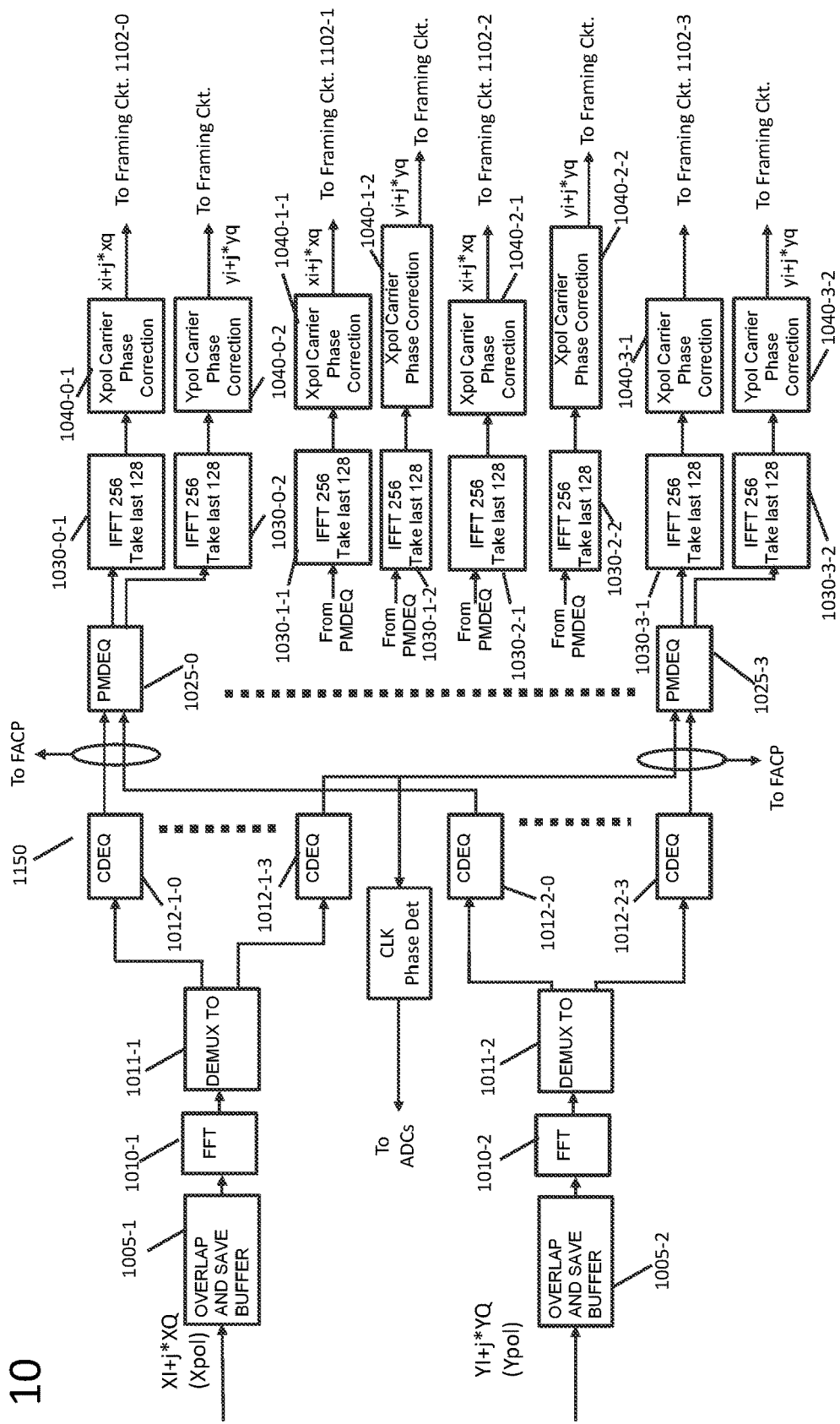
FIG. 10 shows part of a DSP provided in the receiver of FIG. 9.

FIG. 10 illustrates exemplary components of receiver digital signal processor (DSP) 1150. As noted above, analog-to-digital (ND) circuits 940-1 and 940-2 (FIG. 11a) output digital samples corresponding to the analog inputs supplied thereto. In one example, the samples may be supplied by each ND circuit at a rate of 64 GSamples/s. The digital samples correspond to symbols carried by the X polarization of the optical subcarriers and may be represented by the complex number XI+jXQ. The digital samples may be provided to overlap and save buffer 1005-1, as shown in FIG. 10. FFT component or circuit 1010-1 may receive the 2048 vector elements, for example, from the overlap and save buffer 1005-1 and convert the vector elements to the frequency domain using, for example, a fast Fourier transform (FFT). The FFT component 1010-1 may convert the 2048 vector elements to 2048 frequency components, each of which may be stored in a register or "bin" or other memory, as a result of carrying out the FFT.

The frequency components then may be demultiplexed by demultiplexer 1011-1, and groups of such components may be supplied to a respective one of chromatic dispersion equalizer circuits CDEQ 1012-1-0 to 1012-1-3, each of which may include a finite impulse response (FIR) filter that corrects, offsets or reduces the effects of, or errors associated with, chromatic dispersion of the transmitted optical subcarriers. Each of CDEQ circuits 1012-1-0 to 1012-1-3 supplies an output to a corresponding polarization mode dispersion (PMD) equalizer circuit 1025-0 to 1025-3 (which individually or collectively may be referred to as 1025).

Digital samples output from ND circuits 940-2 associated with Y polarization components of subcarrier SC1 may be processed in a similar manner to that of digital samples output from ND circuits 940-1 and associated with the X polarization component of each subcarrier. Namely, overlap and save buffer 1005-2, FFT 1010-2, demultiplexer 1011-2, and CDEQ circuits 1012-2-0 to 1012-2-3 may have a similar structure and operate in a similar fashion as buffer 1005-1, FFT 1010-1, demultiplexer 102-1, and CDEQ circuits 1012-1-0 to 1012-1-3, respectively. For example, each of CDEQ circuits 1012-2-0 to 1012-3 may include an FIR filter that corrects, offsets, or reduces the effects of, or errors associated with, chromatic dispersion of the transmitted optical subcarriers. In addition, each of CDEQ circuits 1012-2-0 to 1012-2-3 provide an output to a corresponding one of PMDEQ 1025-0 to 1025-3.

As further shown in FIG. 10, the output of one of the CDEQ circuits, such as CDEQ 1012-1-0 may be supplied to clock phase detector circuit 1013 to determine a clock phase or clock timing associated with the received subcarriers. Such phase or timing information or data may be supplied to ADCs 1140-1 and 1140-2 to adjust or control the timing of the digital samples output from ADCs 1140-1 and 1140-2.

Each of PMDEQ circuits 1025 may include another FIR filter that corrects, offsets or reduces the effects of, or errors associated with, PMD of the transmitted optical subcarriers. Each of PMDEQ circuits 1025 may supply a first output to a respective one of IFFT components or circuits 1030-0-1 to 1030-3-1 and a second output to a respective one of IFFT components or circuits 1030-0-2 to 1030-3-2, each of which may convert a 256-element vector, in this example, back to the time domain as 256 samples in accordance with, for example, an inverse fast Fourier transform (IFFT).

Time domain signals or data output from IFFT 1030-0-1 to 1030-3-1 are supplied to a corresponding one of Xpol carrier phase correction circuits 1040-1-1 to 1040-3-1, which may apply carrier recovery techniques to compensate for X polarization transmitter (e.g., laser 408) and receiver (e.g., local oscillator laser 1110) laser linewidths. In some implementations, each carrier phase correction circuit 1040-0-1 to 1040-3-1 may compensate or correct for frequency and/or phase differences between the X polarization of the transmit signal and the X polarization of light from the local oscillator 1100 based on an output of Xpol carrier recovery circuit 1040-0-1, which performs carrier recovery in connection with one of the subcarrier based on the outputs of IFFT 1030-01. After such X polarization carrier phase correction, the data associated with the X polarization component may be represented as symbols having the complex representation xi+j*xq in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 1025 may be updated based on the output of at least one of carrier phase correction circuits 1040-0-1 to 1040-3-01.

In a similar manner, time domain signals or data output from IFFT 1030-0-2 to 1030-3-2 are supplied to a corresponding one of Ypol carrier phase correction circuits 1040-

0-2 to 1040-3-2, which may compensate or correct for Y polarization transmitter (e.g., laser 908) and receiver (e.g., local oscillator laser 1110) linewidths. In some implementations, each carrier phase correction circuit 1040-0-2 to 1040-3-2 also may correct or compensate for frequency and/or phase differences between the Y polarization of the transmit signal and the Y polarization of light from the local oscillator 1110. After such Y polarization carrier phase correction, the data associated with the Y polarization component may be represented as symbols having the complex representation yi+j*yq in a constellation, such as a QPSK constellation or a constellation associated with another modulation formation, such as an m-quadrature amplitude modulation (QAM), m being an integer. In some implementations, the output of one of circuits 1040-0-2 to 1040-3-2 may be used to update the taps of the FIR filter included in one or more of PMDEQ circuits 1025 instead of, or in addition to, the output of at least one of the phase correction circuits 1040-0-1 to 1040-3-1. As further shown in FIG. 10, the phase corrected output signals of circuits 1040 may be supplied to framing circuits described below.

Figure 11A:
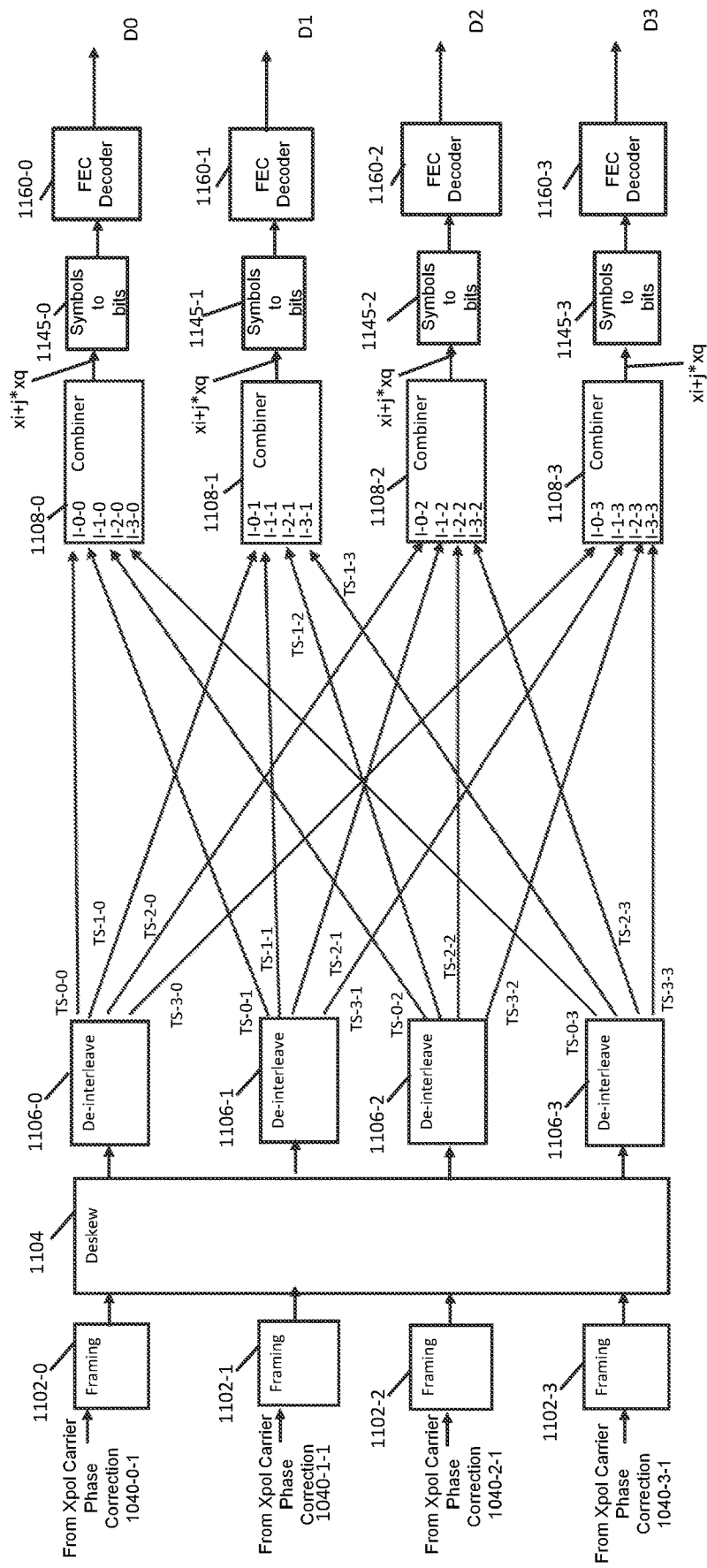
FIG. 11a shows another part of the DSP provided in the receiver of FIG. 9.

Framing and de-interleaving will next be described with reference to FIG. 11a. For ease of explanation, framing, de-skewing, de-interleaving, and additional processing of X pol symbols is shown in FIG. 11a. It is understood that similar circuitry as that shown in FIG. 11a may be provided for framing, de-skewing, de-interleaving, and additional processing of Y polarization symbols output from carrier phase correction circuits 1040-0-2 to 1040-3-2.

As shown in FIG. 11a, each of phase correction circuits 1040-0-1 to 1040-3-1 supply symbols to a respective one of framing circuits 1102-0 to 1102-3, which include circuitry for identifying the inserted overhead bits noted above and provide time slots including symbols output from circuits 1040 to deskew circuit 1104. Deskew circuit 1104 is operable to align frame or time slots (portions) of data as shown in FIGS. 11b and 11c. For example, due to delays in transmission or in processing of time slots, the time slots may be delayed relative to one another by a skew (see FIG. 11b). Deskew circuit 1104 may include memories, such as buffers, that temporarily store received time slots, such as time slots TS-0-1 and TS-0-2, and output such time slots, based on the identified overhead bits, whereby the time slots are temporally aligned with one another to facilitate proper operation of the de-interleaver and combiner circuits discussed below.

As further shown in FIG. 11a, the time slots associated with subcarriers SC0 to SC3 are fed to respective de-interleaver circuits 1106-0 to 1106-3. In addition, each time slot is supplied to a corresponding input of a respective one of combiners 1108-0 to 1108-3. Table 2 below lists each combiner input and the time slot received by such input.

TABLE 2

| Combiner Input | Time Slot | Combiner |
|---|---|---|
| I-0-0 | TS-0-0 | 1108-0 |
| I-1-0 | TS-1-0 | 1108-0 |
| I-2-0 | TS-2-0 | 1108-0 |
| I-3-0 | TS-3-0 | 1108-0 |
| I-0-1 | TS-0-1 | 1108-1 |
| I-1-1 | TS-1-1 | 1108-1 |
| I-2-1 | TS-2-1 | 1108-1 |
| I-3-1 | TS-3-1 | 1108-1 |
| I-0-2 | TS-0-2 | 1108-2 |
| I-1-2 | TS-1-2 | 1108-2 |
| I-2-2 | TS-2-2 | 1108-2 |
| I-3-2 | TS-3-2 | 1108-2 |

TABLE 2-continued

| Combiner Input | Time Slot | Combiner |
|---|---|---|
| I-0-3 | TS-0-3 | 1108-3 |
| I-1-3 | TS-1-3 | 1108-3 |
| I-2-3 | TS-2-3 | 1108-3 |
| I-3-3 | TS-3-3 | 1108-3 |

FIGS. 12a to 12d show examples of sequences of times slots that are input to de-interleavers 1106-0 to 1106-3, respectively. Namely, time slots TS-0-0 to TS-3-0 are successively input to de-interleaver 1106-0; time slots TS-0-1 to TS-3-1 are successively input to de-interleaver 1106-1; time slots TS-0-2 to TS-3-2 are successively input to de-interleaver 1106-2; and time slots TS-0-3 to TS-3-3 are successively input to de-interleaver 1106-3. As shown in FIG. 11a, and as noted above, each de-interleave supplies a respective time slot to corresponding input of combiners 1108-0 to 1108-3. Each combiner 1108, in turn, reconstructs and outputs the series of time slots (including the X polarization symbols) input to distributor 506 noted above with respect to FIGS. 5 and 6a-6d. For example, combiner 1108-0 receives and sequentially outputs time slots sequentially outputs time slots TS-0-0, TS-1-0, TS-2-0, and TS3-0 (see FIG. 13a); combiner 1108-1 receives and sequentially outputs TS-0-1, TS-1-1, TS-2-1, and TS3-1 (see FIG. 13b); combiner 1108-2 receives and sequentially outputs time slots TS-0-2, TS-1-2, TS-2-2, and TS3-2 (see FIG. 13c); and combiner 1108-3 receives and sequentially outputs time slots TS-0-3, TS-1-3, TS-2-3, and TS3-3 (see FIG. 13d).

Each combiner 1108-0 to 1108-3 has an output that supplies the time slots supplied therefrom to a respective one of symbols to bits circuits 1145-0 to 1145-3. Each of the symbols-to-bits circuits or components 1145-0 to 1145-3 may receive the symbols output from a corresponding one of combiner circuits 1108-0 to 1108-3 and map the symbols back to bits. For example, each of the symbol-to-bits components 1145-0 to 1145-3 may map one X polarization symbol, in a QPSK or m-QAM (m being an integer greater than 2) constellation, to Z bits, where Z is an integer. For dual-polarization QPSK modulated subcarriers, Z is four. Bits output from each of component 1145-0 to 1145-3 are provided to a corresponding one of FEC decoder circuits 1160-0 to 1160-3.

Each of FEC decoder circuits 1260 may remove errors in the outputs of symbol-to-bit circuits 1245 using, for example, forward error correction. Such error corrected bits, which may include user data for output from second node 114, are then output as data streams D0 to D3, which were supplied to first node 110, as noted above.

Figure 14:
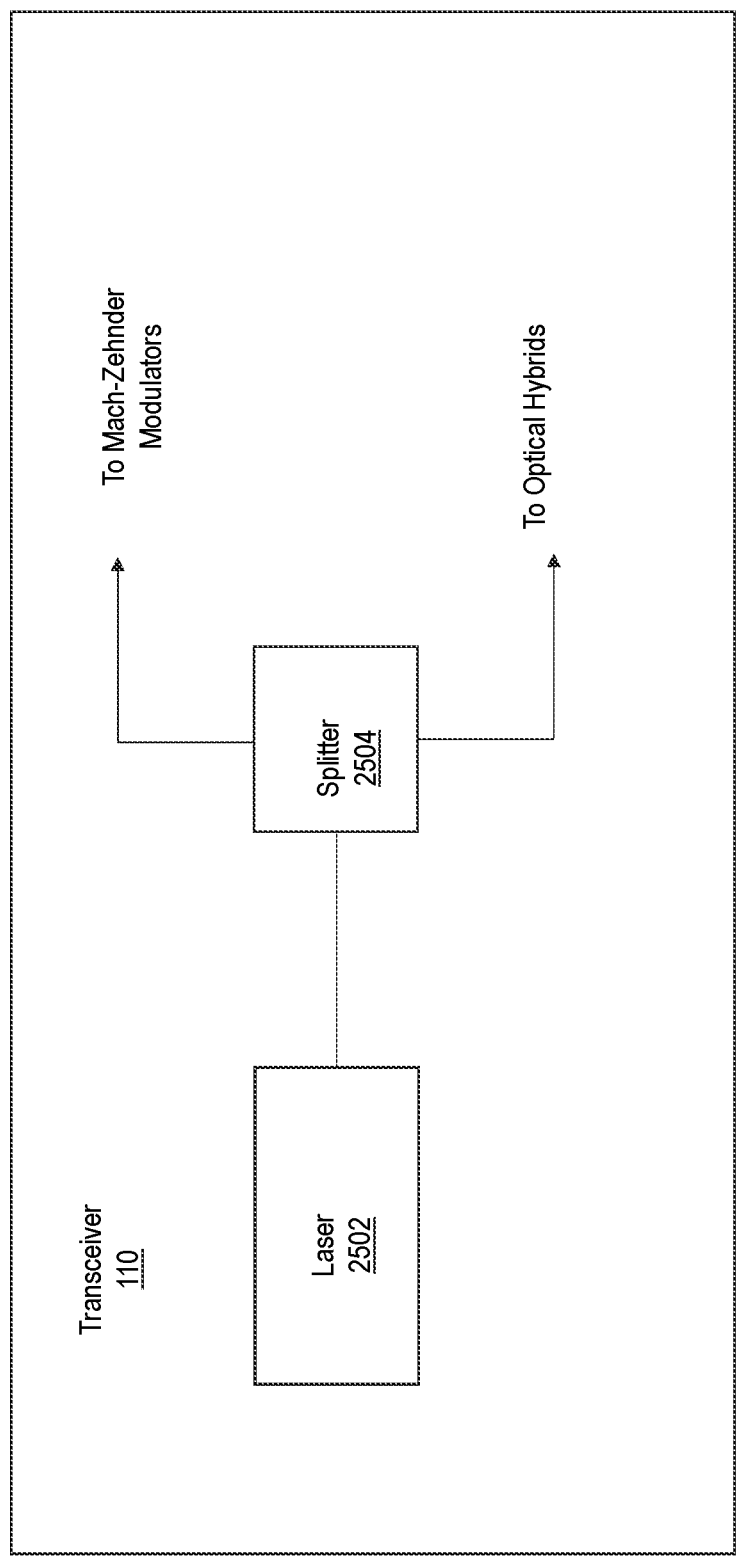
FIG. 14 shows an example of a shared laser consistent with the present disclosure.

In addition, although separate lasers 408 and 910 are provided in the transmitter and receiver, respectively, as noted above, a transceiver consistent with the present disclosure may include a common laser that is "shared" between the transmitter and receiver. For example, FIG. 14 is a diagram illustrating an example of the transceiver 110 using a shared laser 2502 providing optical signals both for transmission and reception (as a local oscillator signal) in accordance with one or more implementations of the present disclosure. As shown, the laser 2502 generates an optical signal and provides the optical signal to the splitter 2504. The splitter 2504 splits the optical signal into two portions. One portion is provided to the optical hybrids or mixers 920-1 and 920-2, while the other portion is provided to modulators 410-1 to 410-4.

Figure 15:
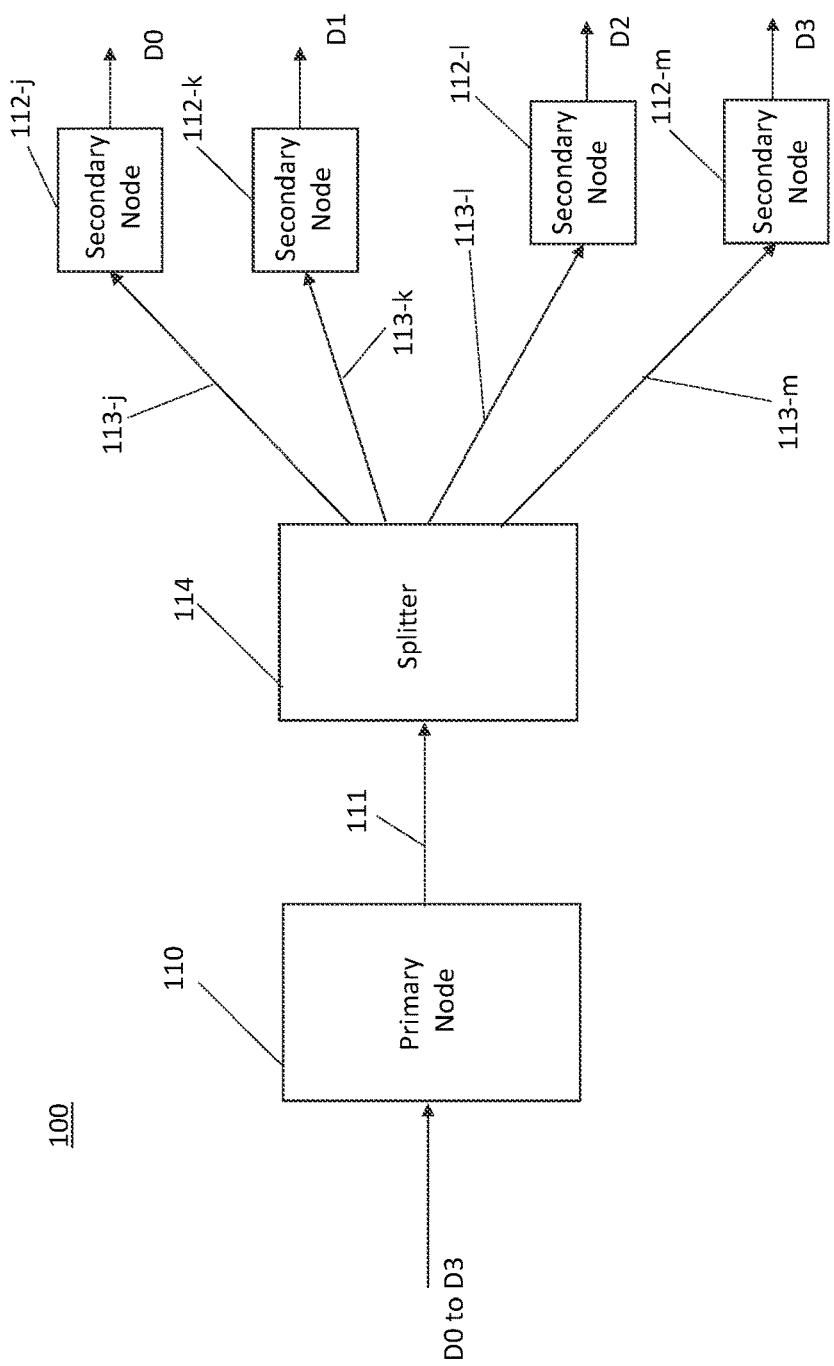
FIG. 15 shows a block diagram of an aggregation network 100 consistent with a further aspect of the present disclosure.
Figure 16:
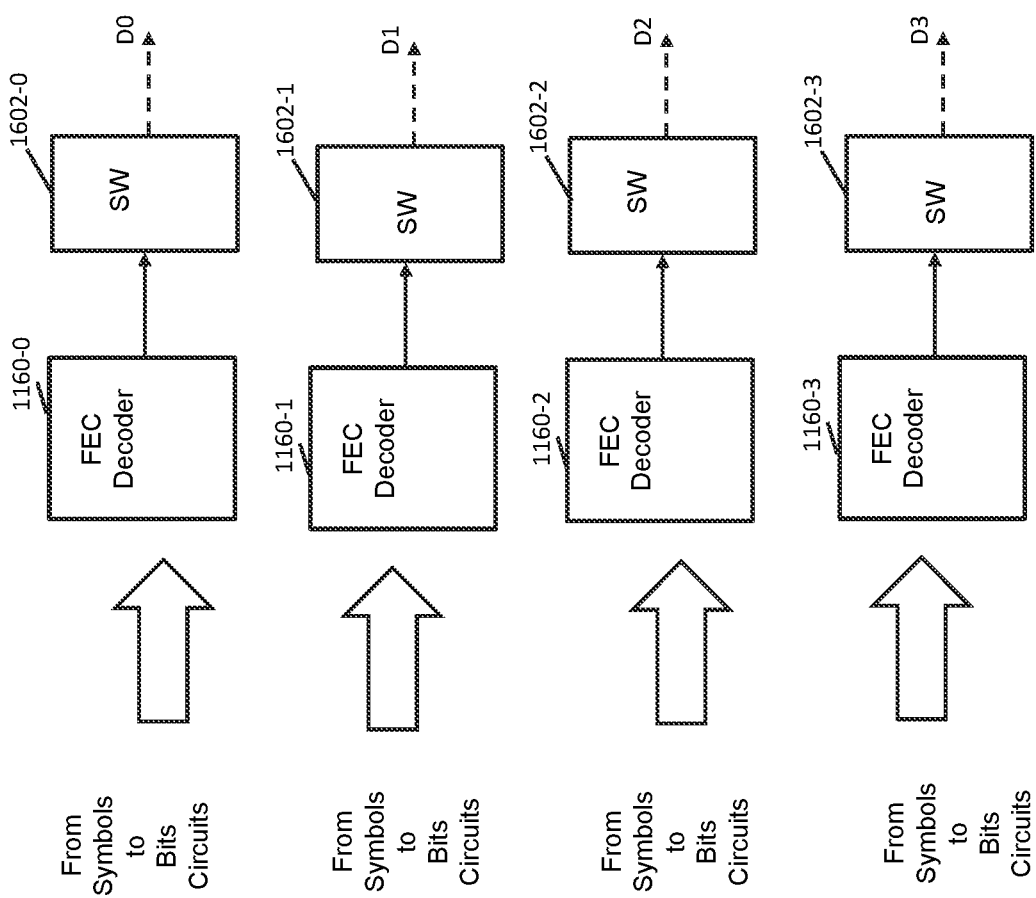
FIG. 16 shows an example of a portion of a leaf receiver consistent with the present disclosure.

FIG. 15 illustrates an example of an aggregation network 100 consistent with a further aspect of the present disclosure in which primary node 110 may communicate with multiple secondary nodes 112-j to 112-m, which sometimes may be referred to individually or collectively as secondary node(s) 112. Secondary nodes 112, in one example, are remote from primary node 110. Primary node 110 may transmit optical subcarriers, as described above, in a downstream direction onto an optical communication path 111, which, like each of optical communication paths 113-j to 113-m, may include one or more segments of optical fiber, as well as one or more optical amplifiers, reconfigurable add-drop multiplexers (ROADMs) or other optical fiber communication equipment. Splitter 114 may be coupled to an end of optical communication path 111 to receive the optical subcarriers and provide a power split portion of each subcarrier to a corresponding one of secondary nodes 112-j to 112-m via a respective one of optical communication paths 113-j to 113-m.

Primary or hub node 110 may include a transmitter having a similar operation and construction as the transmitter described above. Each of secondary or leaf nodes 112-j to 112-m may include a receiver similar having a similar operation and construction as that described above. As further shown in FIG. 15, the hub node receiving first data (D0) and second data (D1), as well as data D2 and D3. The primary or hub node supplying a plurality of optical subcarriers, e.g., subcarriers SC0 to SC3, as noted above. A first optical subcarrier, e.g., subcarrier SC0, among the plurality of optical subcarriers carrying first information indicative of a first portion, e.g., time slots TS-0-0, of the first data (D0) and second information indicative of a first portion (TS-0-1) of the second data. The first leaf node, e.g., 112-j, may receive the first and second optical subcarriers, e.g., subcarriers SC0 and SC1, as well as subcarriers SC2 and SC3, and output the first data, e.g., D0, but not the second data (D1). In addition, the second leaf node (e.g., node 112-k) may receive the first (SC0) and second optical subcarriers (SC1), as well as subcarriers SC2 and SC3, and output the second data (D1) but not the first data (D0). Receivers in nodes 112-l and 112-m may operate in a similar manner to output data D2 and D3, respectively, to the exclusion of other data streams, in one example.

In the examples discussed above with respect to FIGS. 1-14, the receiver is operable to output each of data streams D0-D3. In the example shown in FIG. 15, however, each receiver provided in nodes 112-j to 112-m outputs a respective one of data streams D0 to D3. Accordingly, consistent with a further aspect of the present disclosure, receivers in node 112-j to 112-m are configured to be able to selectively block data that is not intended for output from such node. For example, switch circuitry 1602-0 to 1602-3 may be provided in the receiver of node 112-j to selectively pass one of data streams D0 to D3, while blocking the remaining data streams. For example, switch 1602-0 may be operable to pass data D0, while switches 1602-1 to 1602-3 may be configured to block data streams D1 to D3. It is noted that each of switches 1602-0 to 1602-3 may be reconfigurable, such at during a give time period one or more of switches 1602 is configured to pass one or more of data streams D0-D3, while the other switches are operable to block those data stream are not intended to be output. In another time period, the switches may be reconfigured, for example, by application of a control signal, such that other data streams are passed while the earlier data streams are blocked.

In each of the above example, the time slots include a plurality of symbols. It is understood, however, that each time slot may include one symbol, both in the X and Y polarizations.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
a first forward error correction encoder operable to receive first bits and provide first encoded data based on the first bits;
a second forward error correction encoder operable to receive second bits and provided second encoded data based on the second bits;
a first distributor circuit operable to provide a first plurality of data portions indicative of the first encoded data;
a second distributor circuit operable to provide a second plurality of data portions indicative of the second encoded data;
an interleaver circuit operable to receive a first one of the first plurality of data portions and a first one of the second plurality of data portions, the interleaver circuit having an output that supplies said first one of the first plurality of data portions and said first one of the second plurality of data portions; and
a fast Fourier transform circuit operable to provide first frequency domain data based on the first one of the first plurality of data portions and second frequency domain data based on the first one of the second plurality of data portions.

2. An apparatus in accordance with claim 1, wherein the interleaver circuit is a first interleaver circuit and the fast Fourier transform circuit is a first fast Fourier transform circuit, the apparatus further including:
a second interleaver circuit operable to receive a second one of the first plurality of data portions and a second one of the second plurality of data portions; and
a second fast Fourier transform circuit operable to provide third frequency domain data based on the second one of the first plurality of data portions and fourth frequency domain data based on the second one of the second plurality of data portions.

3. An apparatus in accordance with claim 2, further including a multiplexer that receives inputs indicative of at least one of the first and second frequency domain data and at least one of the third and fourth frequency domain data.

4. An apparatus in accordance with claim 2, further including:
a laser operable to provide an optical signal; and
a modulator operable to modulate the optical signal to provide a plurality of optical subcarriers, a first one of the plurality of optical subcarriers carrying first information indicative of said first one of the first plurality of data portions during a first time interval and second information indicative of said first one of the second plurality of data portions during a second time interval, and a second one of the plurality of optical subcarriers carrying third information indicative of said second one of the first plurality of data portions during the first time interval and fourth information indicative of said second one of the second plurality of data portions during the second time interval.

5. An apparatus in accordance with claim 4, wherein each of the plurality of optical subcarriers is a Nyquist subcarrier.

6. An apparatus in accordance with claim 1, further including:
- a laser operable to provide an optical signal; and
- a modulator operable to modulate the optical signal to provide a plurality of optical subcarriers, one of the plurality of optical subcarriers carrying first information indicative of said first one of the first plurality of data portions during a first time interval and second information indicative of said first one of the second plurality of data portions during a second time interval.

7. An apparatus in accordance with claim 6, wherein each of the plurality of optical subcarriers is a Nyquist subcarrier.

8. An apparatus in accordance with claim 1, further including circuitry operable to provide first overhead information to the first one of the first plurality of data portions and the first one of the second plurality of data portions.

9. An apparatus in accordance with claim 6, wherein the modulator includes a Mach-Zehnder modulator.

10. An apparatus in accordance with claim 1, further including:
- a laser operable to provide an optical signal;
- a splitter operable to receive the optical signal, the splitter having first and second outputs, the first output providing a first portion of the optical signal;
- a modulator operable to modulate the first portion of the optical signal to provide a plurality of optical subcarriers, one of the plurality of optical subcarriers carrying first information indicative of said first one of the first plurality of data portions during a first time interval and second information indicative of said first one of the second plurality of data portions during a second time interval.

11. An apparatus, comprising:
- a first carrier phase correction circuit operable to receive a first input signal and provide first phase corrected output signals;
- a second carrier phase correction circuit operable to receive a second input signal and provide second phase corrected output signals;
- a first de-interleave circuit operable to receive first signals indicative of the first phase corrected output signals, the first de-interleave circuit having a plurality of outputs, each of which supplying a respective one of a first plurality of data portions;
- a second de-interleave circuit operable to receive second signals indicative of the second phase corrected output signals, the second de-interleave circuit having a plurality of outputs, each of which supplying a respective one of a second plurality of data portions;
- a combiner circuit operable to receive one of the first plurality of data portions and one of the second plurality of data portions;
- a symbols-to-bits circuit operable to receive said one of the first plurality of data portions before said one of the second plurality of data portions, the symbols to bits circuit supplying a plurality of bits; and
- a forward error correction decoder operable to provide a decoded output based on the plurality of bits.

12. An apparatus in accordance with claim 11, wherein the symbols-to-bits circuit is a first symbols-to-bits circuit, the combiner is a first combiner, said one of the first plurality of data portions is a first one of the plurality of data portions, said one of the second plurality of data portions is a second one of the plurality of data portions, the plurality of bits is a first plurality of bits, the forward error correction decoder is a first forward error correction decoder, and the decoded output is a first decoded output, the apparatus further including:
- a second combiner operable to receive to receive a second one of the first plurality of data portions and a second one of the second plurality of data portions;
- a second symbols-to-bits circuit operable to receive said second one of the first plurality of data portions before said second one of the second plurality of data portions, the second symbols to bits circuit supplying a second plurality of bits; and
- a second forward error correction decoder operable to provide a second decoded output based on the second plurality of bits.

13. An apparatus in accordance with claim 12, further including:
- a first switch coupled to the first forward error correction decoder, the first switch being operable to selectively supply the first decoded output; and
- a second switch coupled to the second forward error correction decoder, the second switch being operable to selectively supply the second decoded output.

14. An apparatus in accordance with claim 12, wherein the first input signal is associated with a first optical subcarrier among a plurality of optical subcarriers, and the second input signal is associated with a second optical subcarrier among the plurality of optical subcarriers, the apparatus further including:
- an optical hybrid circuit that receives a modulated optical signal including the plurality of optical subcarriers and a local oscillator signal, the optical hybrid circuit providing a plurality of mixing products;
- photodiode circuitry operable to provide electrical signals based on the mixing products, the first and second input signals being indicative of the mixing products.

15. An apparatus in accordance with claim 14, wherein each of the plurality of optical subcarriers is a Nyquist subcarrier.

16. An apparatus in accordance with claim 11, wherein said one of the first plurality of data portions is associated with a first optical subcarrier and said one of the second plurality of data portions is associated with a second optical subcarrier.

17. An apparatus in accordance with claim 16, wherein each of the first and second optical subcarriers is a Nyquist subcarrier.

18. An apparatus in accordance with claim 11, comprising:
- deskew circuitry operable to reduce an amount of skew between the first signals indicative of the first phase corrected output signals and the second signals indicative of the second phase corrected output signals.

19. An apparatus in accordance with claim 18, wherein the amount of skew is based on respective temporal locations of overhead information included in the first signals indicative of the first phase corrected output signal and the second signals indicative of the second phase corrected output signals.

20. An apparatus according to claim 11, further including photodiode circuitry that is operable to output electrical signals based on received optical signals, the first and second input signals being based on the electrical signals output from the photodiode circuitry.

* * * * *